United States Patent [19]

Grosjean

[11] Patent Number: 4,753,337
[45] Date of Patent: Jun. 28, 1988

[54] APPARATUS FOR ACTUATING A BREAKAWAY CONVEYOR SECTION

[76] Inventor: Robert M. Grosjean, 4625 Merry La., Toledo, Ohio 43615

[21] Appl. No.: 908,710

[22] Filed: Sep. 18, 1986

[51] Int. Cl.⁴ .............................................. B65G 43/00
[52] U.S. Cl. ..................................... 198/583; 198/592; 198/860.4; 198/950
[58] Field of Search ...................... 198/860.4, 583, 592, 198/DIG. 950; 414/268, 285, 318, 327

[56] References Cited

U.S. PATENT DOCUMENTS

| | | | |
|---|---|---|---|
| 3,630,439 | 12/1971 | Cook | 104/103 |
| 4,497,254 | 2/1985 | Schmidt | 198/950 |

FOREIGN PATENT DOCUMENTS

| | | | |
|---|---|---|---|
| 0062874 | 5/1977 | Japan | 198/950 |
| 0048318 | 3/1984 | Japan | 198/950 |

*Primary Examiner*—Jerome W. Massie, IV
*Assistant Examiner*—Terry Lee Melius
*Attorney, Agent, or Firm*—Allen D. Gutchess, Jr.

[57] ABSTRACT

An apparatus for actuating a breakaway conveyor section includes an actuating means positioned below a lower edge of a fire door adapted to move vertically downward along an outside wall of a building to close an opening. A breakaway conveyor section is pivotly connected to an end of a fixed conveyor section outside the building and extends adjacent to an end of a fixed conveyor section inside the building and extending into the opening in the wall. The actuating means includes an actuating plate positioned below a lower edge of the fire door and pivotally connected to a pair of generally vertically extending slides by a pair of lever arms. The slides are maintained in an upper position by a pair of link arms pivotally connected to form an over center mechanism attached between the slides and the conveyor inside the building. A lower end of the slides is slidingly attached to horizontal slides which extend through the opening in the wall to support a free end of the breakaway conveyor section. When the fire door is released, it falls, striking the actuating plate which pivots about the vertical slides to release the over center mechanism and allows the vertical slides to drop. The falling vertical slides actuate the horizontal slides to retract them through the wall and allow the breakaway conveyor section free end to pivot downwardly out of the way of the falling fire door.

17 Claims, 1 Drawing Sheet

APPARATUS FOR ACTUATING A BREAKAWAY CONVEYOR SECTION

BACKGROUND OF THE INVENTION

This invention relates to article conveyors in general and in particular to a breakaway conveyor section actuated by a fire door.

In many industries, a product produced inside a plant is transported outside to be loaded onto waiting trucks or trains. Typically, the product is moved by a conveyor extending from inside a building through openings in the walls to an exterior location. A major problem occurs where the openings in the wall must be closed rapidly by fire doors. In order to close the fire door, the conveyor must either be removed from the opening or must be provided with a breakaway section at the opening. Thus, valuable time can be lost before the fire doors can be closed.

SUMMARY OF THE INVENTION

The present invention concerns an actuating apparatus for a breakaway conveyor section which is automatically actuated by a moving fire door. A conventional belt conveyor section extends from an interior of a building to an opening in the building wall. A second belt conveyor section is positioned outside the building wall and the facing ends of the two conveyors are speced apart. A breakaway conveyor section is hingedly connected to the end of the outer conveyor and extends across the gap to a position adjacent the end of the inner conveyor. The free end of the breakaway section is supported on a transversely extending roller which is in turn is supported by a pair of slides extending in a direction parallel to the longitudinal axis of the inner conveyor. A pair of vertically extending posts are positioned on opposite sides of the inner conveyor and are pivotally connected at upper ends to an over center linkage which in turn is pivotally connected at its lower ends to the inner conveyor side rails.

The lower ends of the vertical posts are slidably connected to respective one of the slides. The posts are pivotally connected to a shuttle which is actuated by a falling fire door to force the over center mechanism to release the vertical posts which then fall downwardly under the influence of gravity and force the slides away from the opening in the wall. As the slides move, the supporting roller is withdrawn from beneath the breakaway section which pivots on its hinges to fall out of the way of the descending fire door.

DESCRIPTION OF THE PREFERRED EMBODIMENT

Figure 1:
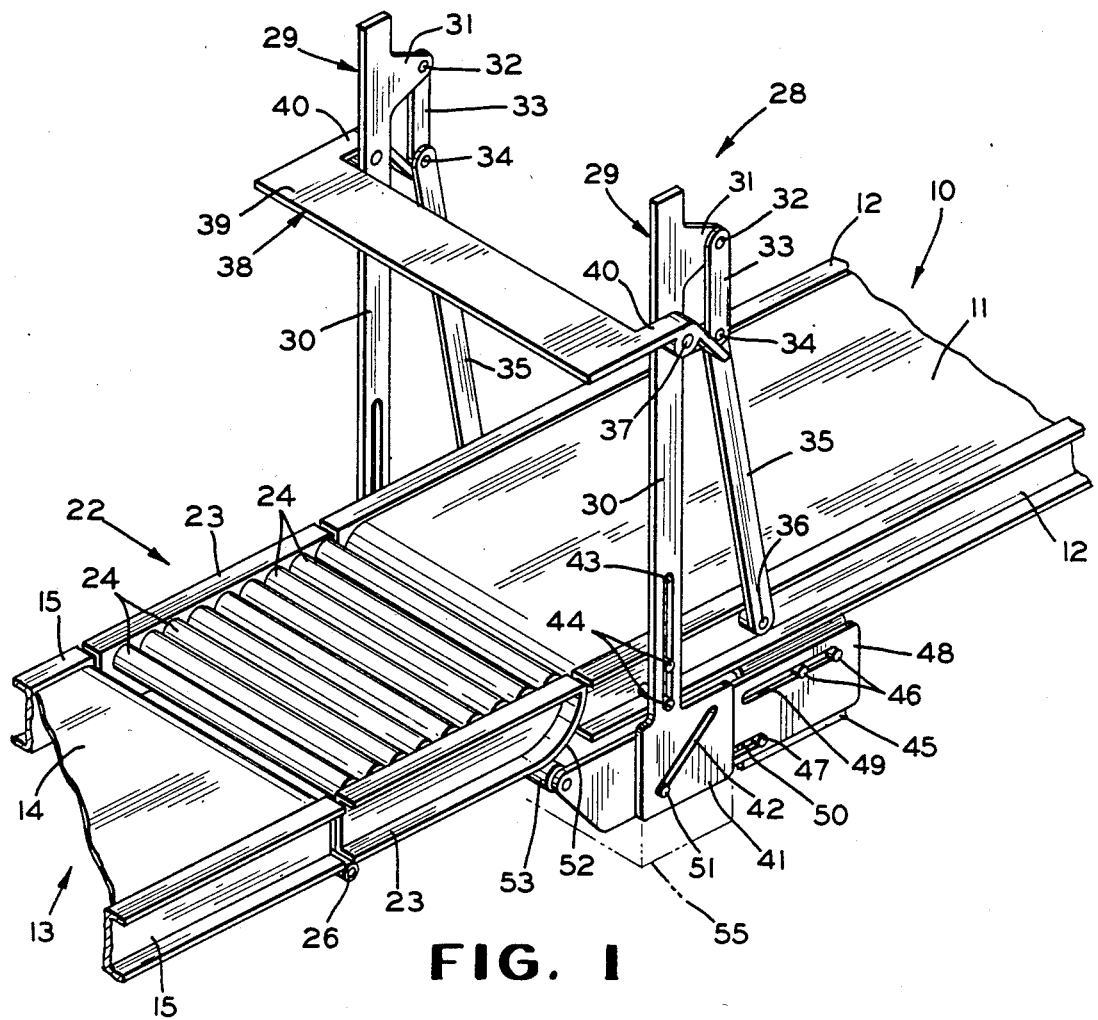
FIG. 1 is a perspective view of a conveyor system including a breakaway section and actuating mechanism according to the present invention.
Figure 2:
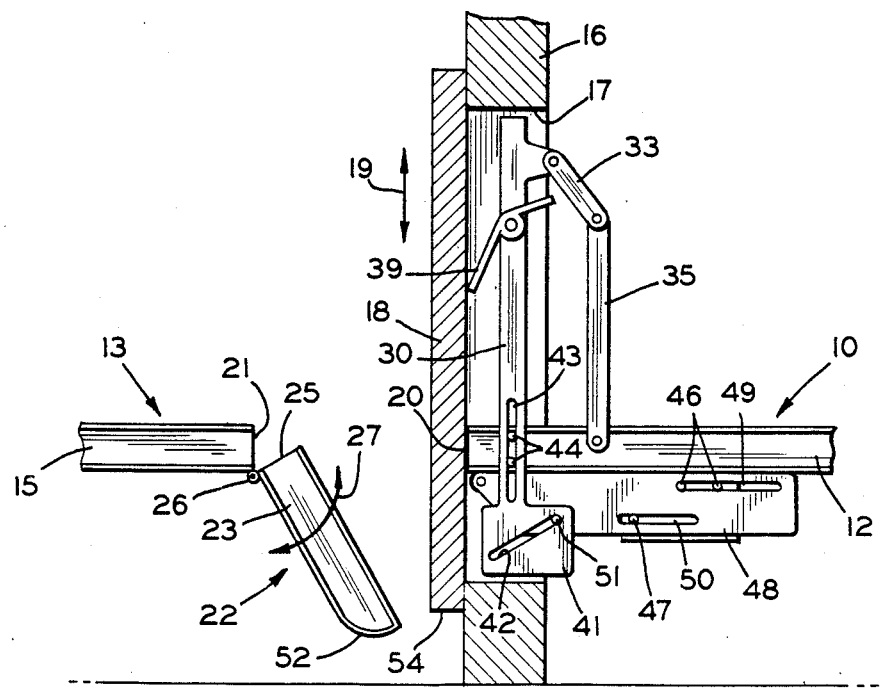
FIG. 2 is a fragmentary side elevational view of the apparatus shown in FIG. 1 installed in an opening in a wall.

Referring to FIGS. 1 and 2, there is shown a conveyor system including a breakaway section and actuating apparatus according to the present invention. A first conveyor section 10 can be a typical commercially available article conveyor which includes an endless belt 11 supported by transversely extending rollers (not shown) between a pair of generally parallel side rails 12. The first conveyor section 10 can either be driven by a motor (not shown) or be tilted with respect to the ground to utilize the force of gravity to move articles. A second conveyor section 13, similar to the first conveyor section 10, includes a conveyor belt 14 supported by transversely extending rollers (not shown) between a pair of generally parallel side rails 15.

Such conveyors are commonly utilized to move articles from inside a building containing manufacturing or storage facilities to a transport located outside the building. With reference to FIG. 2, the first conveyor section 10 is located inside a building having an outer wall 16. An aperture or opening 17 is formed in the wall 16 to permit the passage of articles manufactured and/or stored inside the building to a transport located outside the building.

If there were no need to close the opening 17, the first conveyor section 10 could extend through the opening to the location of the transport. However, it is often desirable to close such an opening for security and/or safety reasons. For example, in case of fire it may be desirable to close the opening with a fireproof door 18 to prevent the spread of the fire. Typically, the door 18 is suspended parallel to the outside of the wall 16 above the opening 17. When it is desired to close the door, a holding mechanism (not shown) is released and the door falls to the closed position shown in FIG. 2. The path of travel of the door is shown by the arrow 19.

If the first conveyor section 10 extended through the opening 17, it would have to be moved before the door 18 could be closed. Therefore, an end 20 of the first conveyor section 10 is spaced adjacent but just inside the plane of the outer surface of the wall 16. The second conveyor section 13 is located outside the wall 16 and has an end 21 spaced from the opening 17 and the end 20 of the first conveyor 10. The space between the ends 20 and 21 is bridged, as shown in FIG. 1, by a breakaway conveyor section 22. The conveyor section 22 includes a pair of generally parallel side rails 23 connected at opposite ends of a plurality of rotatably mounted, transversely extending rollers 24. One end 25 of the conveyor 22 is pivotally connected at 26 to the end 21 of the conveyor 13. Thus, the conveyor section 22 is movable between a non-actuated position shown in FIG. 1 and an actuated position shown in FIG. 2 along a path defined by an arrow 27. When the conveyor section 22 is in the position shown in FIG. 1, articles can be transported on the conveyor belt 11 through the opening 17, across the rollers 24, and onto the belt 14.

The present invention provides an apparatus for actuation by the fire door to move the breakaway section 22 out of the way before the fire door 18 closes the opening 17. The actuating mechanism 28 shown in the drawings is generally symmetrical such that only the elements of one side of the mechanism will be described in detail. A pair of generally vertically extending slides 29 are located on opposite sides of the first conveyor section 10. Each of the vertical slides 29 has an elongated body 30. Formed near the upper end of the body 30 is an ear or projection 31 which is connected at a pivot point 32 to one end of an upper link arm 33. Another end of the upper or first link arm 33 is connected at a pivot point 34 to one end of a lower or second link arm 35. The other end of the link arm 35 is connected at a pivot point 36 to the side rail 12.

Spaced downwardly from the projection 31 on the body 30 is a pivot point 37 to which is connected a shutter 38. The shutter 38 includes a generally horizontally disposed actuating plate 39 extending outside the wall 16 and beneath the lower end of the door 18 when the door is in the raised position. Opposite ends of the plate 39 are connected to common ends of lever arms 40 which are pivotally attached to the vertical slides 29 at the pivot points 37. The opposite end of the lever arm 40 angles downwardly from the horizontal plane of the shutter 38 to engage a lower end of the upper link arm 33 adjacent the pivot point 34. As shown in FIG. 1, the link arms 33 and 35 are positioned over center with the pivot point 34 being closer to the vertical slide 29 than the pivot points 32 and 36.

The lower end of the vertical slide 29 terminates in a foot 41 of generally rectangular shape and having a diagonally extending slot 42 formed therein. The slot 42 extends from adjacent a lower corner of the foot 41, near the wall 16, to an opposite upper corner. A generally vertically extending slot 43 is formed in the elongated body 30 near the foot 41. The slot 43 engages a pair of pins 44 vertically spaced apart and attached to the side rail 12 spaced from the pivot point 36 toward the conveyor end 20. The pins 44 extend normal to the longitudinal axis of the side rail 12 to guide the vertical slide 29 during upward and downward movement.

A support plate 45 extends downwardly from the bottom of the side rail 12 adjacent the pivot point 36. A pair of horizontally spaced apart pins 46 are positioned near an upper edge of the plate 45 away from the end 20 of the conveyor 10 and a third pin 47 is positioned near the lower edge of plate 45 near the end 20 of the conveyor 10. The pins extend normal to the longitudinal axis of the side rail 12. A sliding plate 48 is positioned between the support plate 45 and the foot 41 of the vertical slide 29. A generally horizontally extending slot 49 is formed in the sliding plate 48 adjacent an upper edge thereof away from the conveyor end 20 and engages the pins 46. The sliding plate 48 also has a generally horizontally extending slot 50 formed centrally near the lower edge thereof to engage the pin 47. A pin 51 extends normal to the plane of the sliding plate 48 and engages the slot 42 formed in the foot 41. When the actuating mechanism 28 is in the position shown in FIG. 1, the pin 51 is adjacent a lower end of the slot 42, the pin 47 is adjacent the end of the slot 50 away from the foot 41, and the pins 46 are positioned adjacent the end of the slot 49 away from the foot 41.

The end of the sliding plate 48 adjacent to the conveyor end 20 extends through the aperture 17 in the building outer wall 16 to a position beneath a tapered end 52 of the side rails 23 of the conveyor section 22. A support roller 53 is pivotally connected to an upper corner of each of the sliding plates 48. The support rollers 53 contact the lower edge of the side rails 23 and maintain the conveyor section 22 in a generally horizontal non-actuated position as shown in FIG. 1. The roller 53 could be a single roller or fixed bar, but a roller will tend to assist the end 52 of the breakaway conveyor section to move away from the end 20 more quickly.

When the fire door 18 is actuated to move from a position above the aperture 17 to a position covering the aperture 17, a lower edge 54 of the door 18 engages an upper surface of the actuating plate 39. As the door 18 continues to fall, the shutter 28 and the lever arms 40 are rotated about the pivot points 37. Such rotation tends to force the pivotally connected ends of the arms 33 and 35 and the pivot point 34 over center past an imaginary line between the pivot points 32 and 36. Once the link arms 33 and 35 have moved past the over center point, the vertical slides 29 are no longer being supported and are free to move in a downward direction under the influence of gravity. The vertical slides 29 are guided downwardly by the pins 44 acting in the slots 43. The downward movement of the vertical slides 29 forces the pins 51 toward the opposite ends of the slots 42. Thus, the sliding plates 48 are forced away from the conveyor end 20 and are guided by the pins 46 acting in the slot 49 and the pin 47 acting in the slot 50. As the sliding plates 48 are moved, the support roller 53 moves with them allowing the tapered end 52 of the conveyor section 22 to begin pivoting downwardly about the pivot point 26.

When the pin 51 reaches the upper end of the slot 42 and/or the upper one of the pins 44 reaches the upper end of the slot 43, the downward movement of the actuating mechanism 28 is stopped. The support roller 53 has completely cleared the upper edge of the tapered end 52 of the side rails 23 and the breakaway conveyor section 22 has pivoted to an actuated position out of the way of the falling door 18. When the door 18 has completely covered the aperture 17, its downward movement is stopped by a mechanism not shown. In certain installations, it may be desirable to add weight to the actuating mechanism 28 to increase the speed with which it falls. As shown in phantom in FIG. 1, weights 55 can be attached to the lower edges of the feet 41 as required. The actuating mechanism can be reset by raising the door 17 and the conveyor section 22 to the non-actuated positions and moving the link arms 33 and 35 back over center to the position shown in FIG. 1.

In accordance with the provisions of the patent statutes, the principle and mode of operation of the present invention have been described in what is considered to represent the preferred embodiment. However, it should be understood that the invention may be practiced otherwise than as specifically illustrated and described without departing from its spirit or scope.

What is claimed is:

1. An apparatus for actuating a breakaway conveyor with a fire door vertically movable between open and closed positions, the conveyor including a section positioned beneath the fire door in its open position and having one end pivotally mounted on the other end free, the section movable between a non-actuated position to form a continuous conveyor and an actuated position forming a gap in the conveyor allowing the fire door to move to the closed position, the apparatus comprising:

a support means positioned beneath a free end of a breakaway conveyor section and movable between a first position supporting the breakaway section in a non-actuated position and a second position allowing the breakaway section to move to an actuated position; and shutter means attached to said support means for moving said support means between said first and second positions, said shutter means adapted to contact a fire door as the fire door moves vertically from an open to a closed position whereby the breakaway conveyor section is moved from a non-actuated to an actuated position.

2. The apparatus according to claim 1 wherein said support means includes a roller extending transverse to a path of travel of the conveyor section and a pair of sliding plates attached at opposite ends of said roller and slidably mounted on another section of the conveyor adjacent the free end of the breakaway conveyor section.

3. The apparatus according to claim 1 wherein said shutter means includes an actuating plate adapted to be positioned between the breakaway conveyor section and the fire door when the fire door is in its open position, said actuating plate cooperating with an over center means to move said support means from said first position to said second position.

4. The apparatus according to claim 3 wherein said over center means includes two pairs of link arms, each said pair pivotally mounted on an opposite side of the another conveyor section, said link arms of each said pair pivotally attached together for contacting said actuating plate in a first over center position to maintain said support means in said first position whereby actuation of said actuating plate by the fire door moves said link arms to a second over center position shifting said support means to said second position.

5. The apparatus according to claim 4 wherein said shutter means includes a pair of vertically disposed slides slidably connected to the another conveyor section and pivotally connected to said actuating plate, each of said slides pivotally connected to an associated one of said pairs of link arms and slidably connected to said support means, said slides supported in an upper position by said link arms in said first over center position and moveable to a lower position when said link arms are in said second over center position.

6. The apparatus according to claim 5 wherein said shutter means includes a pair of lever arms connected at one end to opposite sides of said actuating plate and pivotally connected to associated ones of said slides, another end of each of said lever arms contacting said link arms of said over center means in said first over center position.

7. In a conveyor system having first and second conveyor sections spaced apart and a breakaway conveyor section having one end pivotally connected to the first conveyor section and a free end adjacent the second conveyor section in a non-actuated position, an apparatus for actuating the breakaway conveyor section to an actuated position wherein the free end is spaced away from the second conveyor section, the apparatus comprising:
- a roller extending transverse to a longitudinal axis of the breakaway conveyor section;
- a pair of sliding plates attached to opposite ends of said roller and slidably mounted on opposite sides of the second conveyor section for movement between a first position wherein said roller supports the free end of the breakaway conveyor section in the non-actuated position and a second position allowing the breakaway conveyor section to move to the actuated position;
- a pair of generally vertically extending slides each having a lower end slidably connected to an associated one of said sliding plates and an upper end;
- an over center means connected between said upper ends of said slides and the second conveyor section, said over center means having a first over center position maintaining said sliding plates in said first position and a second over center position allowing said sliding plates to move to said second position; and
- means for actuating said over center means from said first over center position to said second over center position.

8. The apparatus according to claim 7 wherein said means for actuating includes an actuating plate extending traverse to the longitudinal axis of the breakaway conveyor section and a pair of lever arms, each said lever arm having one end attached to said actuating plate, being pivotally attached to an associated one of said slides, and having another end contacting said over center means in said first over center position.

9. An apparatus for actuating a breakaway conveyor with a fire door movable between open and closed positions, the conveyor including a section positioned beneath the fire door in its open position and having one end pivotally mounted and the other end free, the section movable between a non-actuated position to form a continuous conveyor and an actuated position forming a gap in the conveyor allowing the fire door to move to the closed position, the apparatus comprising:
- a support means positioned beneath a free end of a breakaway conveyor section and movable between a first position supporting the breakaway section in a non-actuated position and a second position allowing the breakaway section to move to an actuated position, said support means including a roller extending transverse to a path of travel of the conveyor section and a pair of sliding plates attached at opposite ends of said roller and slidably mounted on another section of the conveyor adjacent the free end of the breakaway conveyor section and a pair of support plates attached to the another section of the conveyor and having a plurality of pins extending therefrom and wherein said sliding plates each have at least one slot formed therein for engaging said pins of a respective one of said support plates whereby said pins and said slots cooperate to define a path of travel for said sliding plates and said roller between said first and second positions; and
- shutter means attached to said support means for moving said support means between said first and second positions, said shutter means adapted to contact a fire door as the fire door moves from an open to a closed position whereby a breakaway conveyor section is moved from a non-actuated to an actuated position.

10. The apparatus according to claim 9 wherein each of said support plates has at least three pins extending therefrom, two of said pins engaging a first slot formed in an associated one of said sliding plates and a third one of said pins engaging a second slot formed in said associated one of said sliding plates.

11. In a conveyor system having first and second conveyor sections spaced apart and a breakaway conveyor section having one end pivotally connected to the first conveyor section and a free end adjacent the second conveyor section in a non-actuated position, an apparatus for actuating the breakaway conveyor section to an actuated position wherein the free end is spaced away from the second conveyor section, the apparatus comprising:
- a roller extending transverse to a longitudinal axis of the breakaway conveyor section;
- a pair of sliding plates attached to opposite ends of said roller and slidably mounted on opposite sides of the second conveyor section for movement between a first position wherein said roller supports the free end of the breakaway conveyor section in the non-actuated position and a second position allowing the breakaway conveyor section to move to the actuated position;

a pair of generally vertically extending slides each having a lower end slidably connected to an associated one of said sliding plates and an upper end;

an over center means connected between said upper ends of said slides and the second conveyor section, said over center means having a first over center position maintaining said sliding plates in said first position and a second over center position allowing said sliding plates to move to said second position, said over center means including two pairs of link arms, each said pair having an upper arm pivotally connected at one end to an associated one of said slides and a lower arm pivotally connected at one end to the second conveyor section, said upper and lower arms pivotally connected together at another end of each; and means for actuating said over center means from said first over center position to said second over center position.

12. An apparatus for actuating a breakaway conveyor section comprising:

a support means slidably mounted for movement between a non-actuated position for supporting a breakaway conveyor section and an actuated position for allowing movement of the breakaway conveyor section;

a slide slidably connected to said support means, said slide including a generally vertically extending, elongated body slidably mounted with respect to a fixed conveyor section and a generally planar foot attached to a lower end of said body and connected to said support means for moving said support means from said non-actuated position to said actuated position when said slide is moved from an upper position to a lower position with respect to the fixed conveyor section ;

an over center means pivotally connected to said slide for movement between a first over center position maintaining said support means in said non-actuated position and a second over center position whereby said support means is moved to said actuated position; and means for actuating said over center means from said first over center position to said second over center position.

13. An apparatus for actuating a breakaway conveyor section comprising:

a support means slidably mounted for movement between a non-actuated position for supporting a breakaway conveyor section and an actuated position for allowing movement of the breakaway conveyor section;

a slide slidably connected to said support means;

an over-center means pivotally connected to said slide for movement between a first over-center position maintaining said support means in said non-actuated position and a second over-center position whereby said support means is moved to said actuated position, said over-center means including a first generally vertically extending link arm having an upper end pivotally connected at a first pivot point to said slide and a second generally vertically extending link arm having a lower end pivotally connected at a second pivot point to a fixed conveyor section, said first link arm having a lower end pivotally attached at a third pivot point to an upper end of said second link arm, whereby said over-center means is in said first over-center position when said third pivot point is closer to said slide than said first and second pivot points, and is in said second over-center position when said third pivot point is farther away from said slide than said first and second pivot points; and means for actuating said over-center means from said first over-center position to said second over-center position.

14. An apparatus for actuating a breakaway conveyor section comprising:

a support means slidably mounted for movement between a non-actuated position for supporting a breakaway conveyor section and an actuated position for allowing movement of the breakaway conveyor section;

a slide slidably connected to said support means;

an over-center means pivotally connected to said slide for movement between a first over-center position maintaining said support means in said non-actuated position and a second over-center position whereby said support means is moved to said actuated position; and means for actuating said over-center means from said first over-center position to said second over-center position, said means for actuating including a support plate extending generally transverse to a longitudinal axis of the breakaway conveyor section and attached to one end of a lever arm pivotally mounted on said slide, said lever arm having an opposite end in contact with said over-center means in said first over-center position whereby pivotal movement of said actuating plate and lever arm moves said over-center means to said second over-center position.

15. An apparatus for actuating a breakaway conveyor section comprising:

a support means slidably mounted for movement between a non-actuated position for supporting a breakaway conveyor section and an actuated position for allowing movement of the breakaway conveyor section, said support means including a sliding plate slidably mounted on a fixed conveyor section and a roller pivotally attached to said sliding plate and extending beneath the breakaway conveyor section to support the breakaway conveyor section in the non-actuated position;

a slide slidably connected to said support means, said slide including a generally vertically extending, elongated body slidably mounted on the fixed conveyor section and having a lower end slidably connected to said sliding plate;

an over-center means pivotally connected to said slide for movement between a first over-center position maintaining said support means in said non-actuated position and a second over-center position whereby said support means is moved to said actuated position, said over-center means including a pair of link arms pivotally connected together at one end of each and extending in a generally vertical direction with an upper end of one of said link arms pivotally connected to an upper end of said slide and a lower end of the other one of the link arms pivotally connected to the fixed conveyor; and means for actuating said over-center means from said first over-center position to said second over-center position, said means for actuating including a lever arm pivotally connected to said slide and having one end in contact with one of said link arms in said first over-center position.

16. The apparatus according to claim 15 wherein said sliding plate has at least one slot formed therein for engaging at least two pins extending from the fixed conveyor section to define a path of travel between said non-actuated position to said actuated position.

17. The apparatus according to claim 15 wherein said elongated body has at least two slots formed therein, one of said slots engaging a pair of pins extending from the fixed conveyor section and the other one of said slots engaging a pin extending from said sliding plate to define a path of travel between said non-actuated position and said actuated position.

* * * * *

UNITED STATES PATENT AND TRADEMARK OFFICE
CERTIFICATE OF CORRECTION

PATENT NO. : 4,753,337
DATED : June 28, 1988
INVENTOR : Robert M. Grosjean

It is certified that error appears in the above-identified patent and that said Letters Patent is hereby corrected as shown below:

Column 1, line 29, "speced" should be --spaced--.

Claim 1, line 5, "on" should be --and--.

Signed and Sealed this

Eighth Day of November, 1988

Attest:

DONALD J. QUIGG

*Attesting Officer*       *Commissioner of Patents and Trademarks*